(12) United States Patent
Huang et al.

(10) Patent No.: US 7,864,029 B2
(45) Date of Patent: Jan. 4, 2011

(54) VEHICLE-SETTING-BASED DRIVER IDENTIFICATION SYSTEM

(75) Inventors: Jihua Huang, Sterling Heights, MI (US); William C. Lin, Birmingham, MI (US); Yuen-Kwok Chin, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 255 days.

(21) Appl. No.: 12/122,811

(22) Filed: May 19, 2008

(65) Prior Publication Data

US 2009/0284359 A1 Nov. 19, 2009

(51) Int. Cl.
*B60R 25/10* (2006.01)
*G01M 17/00* (2006.01)
(52) U.S. Cl. ..................... 340/426.1; 701/35
(58) Field of Classification Search .............. 340/426.1, 340/5.1, 5.2, 5.8, 5.72; 701/35, 49
See application file for complete search history.

(56) References Cited

U.S. PATENT DOCUMENTS

| | | | | |
|---|---|---|---|---|
| 4,477,874 A | * | 10/1984 | Ikuta et al. | 701/49 |
| 5,243,338 A | * | 9/1993 | Brennan et al. | 340/870.02 |
| 5,712,625 A | * | 1/1998 | Murphy | 340/5.22 |
| 5,910,776 A | * | 6/1999 | Black | 340/10.1 |
| 5,939,795 A | * | 8/1999 | Yu | 307/10.1 |
| 6,078,791 A | * | 6/2000 | Tuttle et al. | 455/90.1 |
| 6,100,811 A | * | 8/2000 | Hsu et al. | 340/5.83 |
| 6,663,010 B2 | * | 12/2003 | Chene et al. | 236/51 |
| 6,690,260 B1 | | 2/2004 | Ashihara | |
| 6,925,425 B2 | * | 8/2005 | Remboski et al. | 702/188 |
| 7,142,696 B1 | * | 11/2006 | Engelsberg et al. | 382/118 |
| 7,224,266 B2 | | 5/2007 | Taipale | |
| 2002/0149480 A1 | * | 10/2002 | Shanks et al. | 340/572.1 |
| 2003/0209893 A1 | * | 11/2003 | Breed et al. | 280/735 |

FOREIGN PATENT DOCUMENTS

JP 07-032972 A 2/1995
KR 10-1999-0052086 A 7/1999

\* cited by examiner

*Primary Examiner*—Benjamin C Lee
*Assistant Examiner*—Sigmund Tang
(74) *Attorney, Agent, or Firm*—John A. Miller; Miller IP Group, PLC

(57) ABSTRACT

A system and method for identifying a person as an authorized driver of a vehicle based on settings of the vehicle. The system includes a sensor for detecting a presence of a driver in the vehicle. The system also includes one or more control modules corresponding to the parameters of the vehicle. The parameters can be controlled by the control modules. The system also includes a driver ID controller coupled to the control modules and the sensor. The driver ID controller is configured to recognize the driver as an authorized driver based on inputs from the sensor and the control modules. The driver ID controller can also command the control units to adjust the parameters to predefined one or more attributes corresponding to the authorized driver.

18 Claims, 8 Drawing Sheets

VEHICLE-SETTING-BASED DRIVER IDENTIFICATION SYSTEM

BACKGROUND OF THE INVENTION

1. Field of the Invention

This invention relates generally to a system and method for identifying a driver of a vehicle and, more particularly, to a system and a method for automatically identifying a driver of a vehicle based on changes in a set of attributes of one or more parameters of one or more components of the vehicle.

2. Discussion of the Related Art

Vehicle designers generally attempt to create a vehicle design that achieves a seamless interaction between the vehicle and a driver of the vehicle. The interaction between the vehicle and the driver can be divided into three interaction levels. A first interaction level is referred to as access where the vehicle should allow only an authorized driver to drive the vehicle. A second interaction level is referred to as accommodation where the vehicle should automatically adjust the interior and the exterior settings to provide maximum comfort and delight to the driver. A third level is referred to as dynamic control where the vehicle should exhibit dynamic characteristics customized for the driver. For example, the vehicle should automatically adjust suspension, brakes and throttle to suit the driving style of the driver.

At present vehicles utilize devices, such as keys, key fobs and RFID immobilizers, to grant access for a driver to the inside of the vehicle. These devices allow the driver to drive the vehicle and use all the functionalities of the vehicle. However, these devices do not take into account whether the driver is authorized to drive the vehicle.

In order to identify authorized drivers and to enhance vehicle security some vehicles use driver identification methodologies to verify the identity of a driver, even after the driver has gained entry in to the vehicle. State of the art driver identification methodologies include using biometric characteristic recognition, such as fingerprints, finger veins, iris, retina, handprint, voice, face, etc.

For the interaction level of accommodation, some vehicles allow each driver to store a set of preferred settings of various vehicle cabin components as a driver profile, such as seat positions, pedal positions, steering wheel positions, mirror positions, door locks, radio settings, cabin temperature, etc. The driver profile can be selected among the stored profiles at a later occasion, such as when the driver drives the vehicle. Once the desired profile corresponding to the driver is selected, the vehicle retrieves the set of preferred settings and adjusts various vehicle components. For the purpose of storing various driver profiles a 'memory package' option is available on some vehicles.

For the interaction level of dynamic control, some vehicles allow each driver to choose from pre-set selections for various vehicle control components, for example, suspension, brakes and throttle, to suit the driving style of the driver. Based on the selection made by the driver the pre-set selections can then be applied to various vehicle components.

Both the interaction levels of accommodation and dynamic control require a manual input. Further, the three interaction levels function independent of each other in the known vehicle designs. A need therefore arises for integrating the three interaction levels to achieve the design of seamless interaction between a vehicle and a driver of the vehicle. Further, such an integrated design should eliminate the need of separate manual input for each interaction level. Additionally, the integrated design should enhance vehicle security by automatic driver identification and should also allow automatic adjustment of vehicle cabin components and vehicle control components.

SUMMARY OF THE INVENTION

In accordance with the teachings of the present invention, a system and a method for driver-specific management of one or more parameters of a vehicle are disclosed. The method includes detecting a presence of a driver in a driving seat of the vehicle. One or more attributes corresponding to the parameters of the vehicle are obtained that are adjustable by the driver, where the attributes are obtained after the presence of the driver is detected. Also, the driver is recognized as the authorized driver based on the attributes. Further, the parameters of the vehicle are adjusted to one or more predefined attributes corresponding to the authorized driver.

Additional features of the present invention will become apparent from the following description and appended claims, taken in conjunction with the accompanying drawings.

DETAILED DISCUSSION OF THE EMBODIMENTS

The following discussion of the embodiments of the invention directed to a system and method for identifying an authorized driver of a vehicle in response to changes in a set of parameters of one or more vehicle components is merely exemplary in nature, and is in no way intended to limit the invention or its applications or uses.

Figure 1:
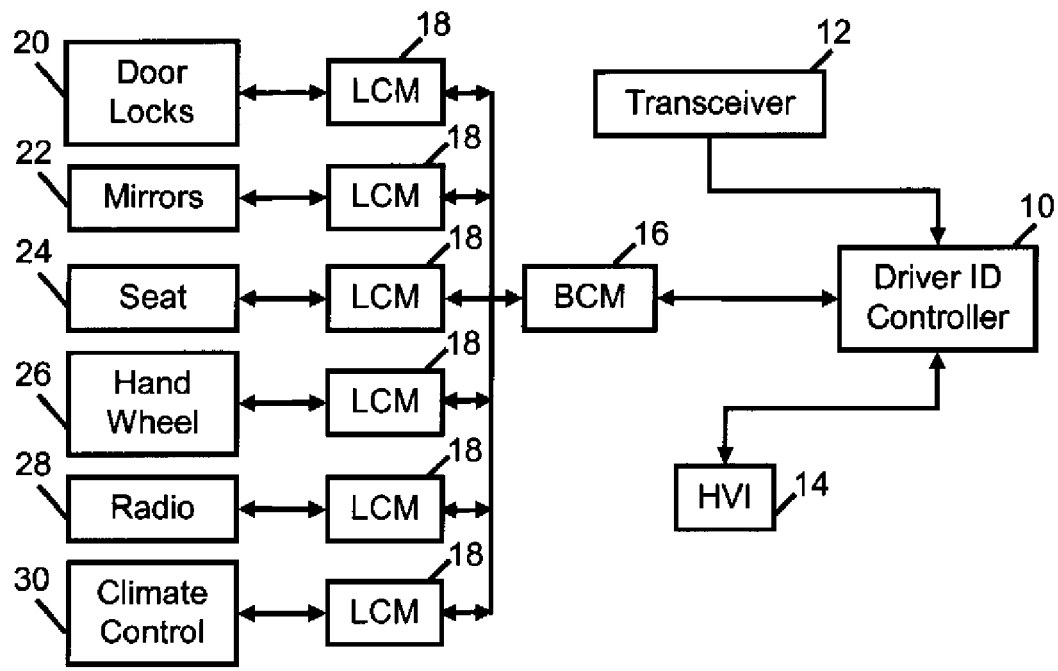
FIG. 1 is a block diagram of a driver identification system, in accordance with an embodiment of the present invention.

FIG. 1 is a block diagram of a driver identification system 32 for identifying a driver of a vehicle, in accordance with an embodiment of the present invention. The driver identification system 32 includes a driver ID controller 10 that interacts with a transceiver 12 and a human vehicle interface (HVI) 14. The transceiver 12 receives an entry signal from an entry device (not shown) associated with the vehicle, such as a key fob, an RFID device, etc., and sends the received signal to the driver ID controller 10 for identification. The HVI 14 includes a processing unit that processes signals from the controller 10 and signals provided by a driver intending to enter or drive the vehicle, as will be discussed in detail below. The driver identification system 32 also includes a vehicle body control module (BCM) 16 that receives control signals from the controller 10, and six local control modules (LCM) 18. Each LCM 18 controls an associated component of the vehicle, such as door locks 20, rear-view mirrors 22, a driving seat 24, a hand wheel 26, a radio 28 and a climate control system 30.

When the driver identification system 32 identifies a driver as one of the authorized drivers out of one or more authorized drivers of the vehicle, based on a change in one or more attributes corresponding to one or more parameters of the one or more components of the vehicle, the driver ID controller 10 obtains the set of parameters after the controller 10 detects the presence of the driver in the driving seat 24. Further, the driver ID controller 10 transmits the retrieved set of parameters to the BCM 16, such as by a high speed controller area network (CAN). Next, the BCM 16 sends the set of parameters to the LCMs 18, such as by a low speed CAN.

For the purposes of the discussed herein, an attribute refers to a particular setting of a particular parameter of a particular component of the vehicle, for example, the position (attribute) of a seat back (parameter) of a seat (component) of the vehicle. A vehicle driver could have a set of attributes for a component and a set of attributes for several of the components, where the set of attributes is the drivers profile.

Figure 2:
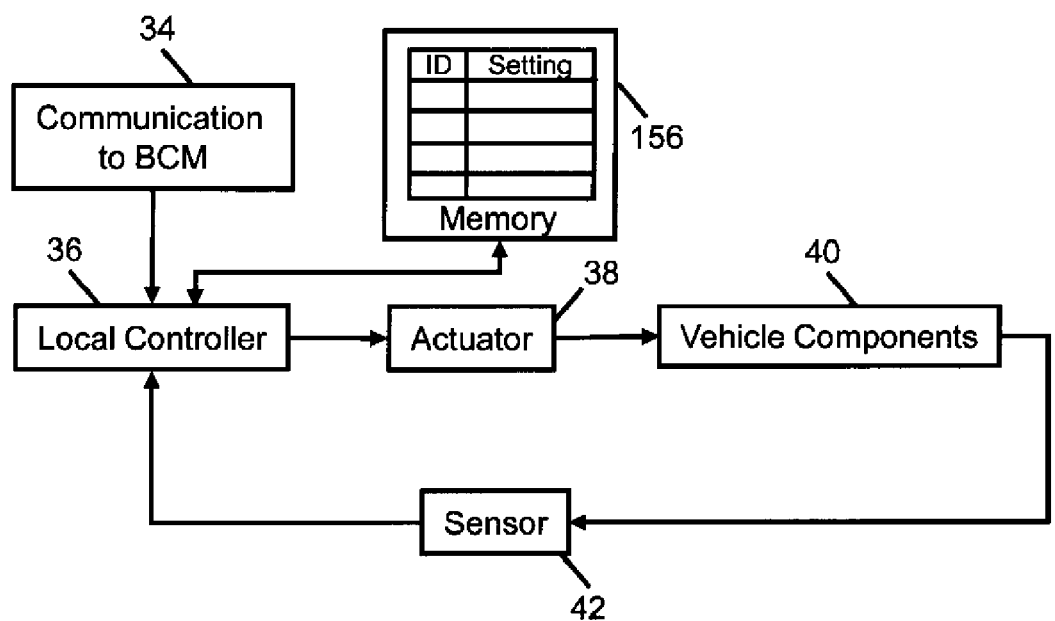
FIG. 2 is a block diagram of a local control module, in accordance with an embodiment of the present invention.

FIG. 2 is a block diagram of one of the LCMs 18 that controls an associated component of the vehicle. The LCM 18 includes a local controller 36, an actuator 38, a vehicle subsystem or component 40, such as one of those referred to above, and a sensor 42. The sensor 42 can be any sensor suitable for the particular vehicle component. The local controller 36 controls the actuator 38 to move the vehicle component 40 in a controlled manner. Further, if the driver moves the vehicle component 40, the sensor 42 can detect the movement and report both a detection of the movement and a final positional parameter of the vehicle component 40 to the local controller 36. The local controller 36, in turn, reports to the driver ID controller 10 via the BCM 16 through a communications network 34. The controller 10 stores the driver ID and setting information in a table, where each set of attributes corresponds to an authorized driver of the vehicle.

In the embodiment discussed above, the driver ID controller 10 stores the information about the drivers. In an alternate embodiment, the LCM 18 can store attributes corresponding to one or more parameters of a component of the vehicle in a table in a memory 156, which resides in the LCM 18. In the embodiment above the driver ID controller 10 stored the setting information for all of the various vehicle sub-systems and components. In this embodiment, the individual LCMs 18 store the information for its particular vehicle component. The local controller 36 retrieves the corresponding setting from the memory 156 and controls the actuator 38 when a driver is detected and identified by the driver ID controller 10. If the driver adjusts the settings, the sensor 42 detects the movement and the local controller 36 reports the detection to the driver ID controller 10. The local controller 36 also reports the value of the new setting. Further, if the driver ID controller 20 creates a new driver profile, the local controller 36 will also create a corresponding new sub-profile to store the new ID and setting.

Figure 3:
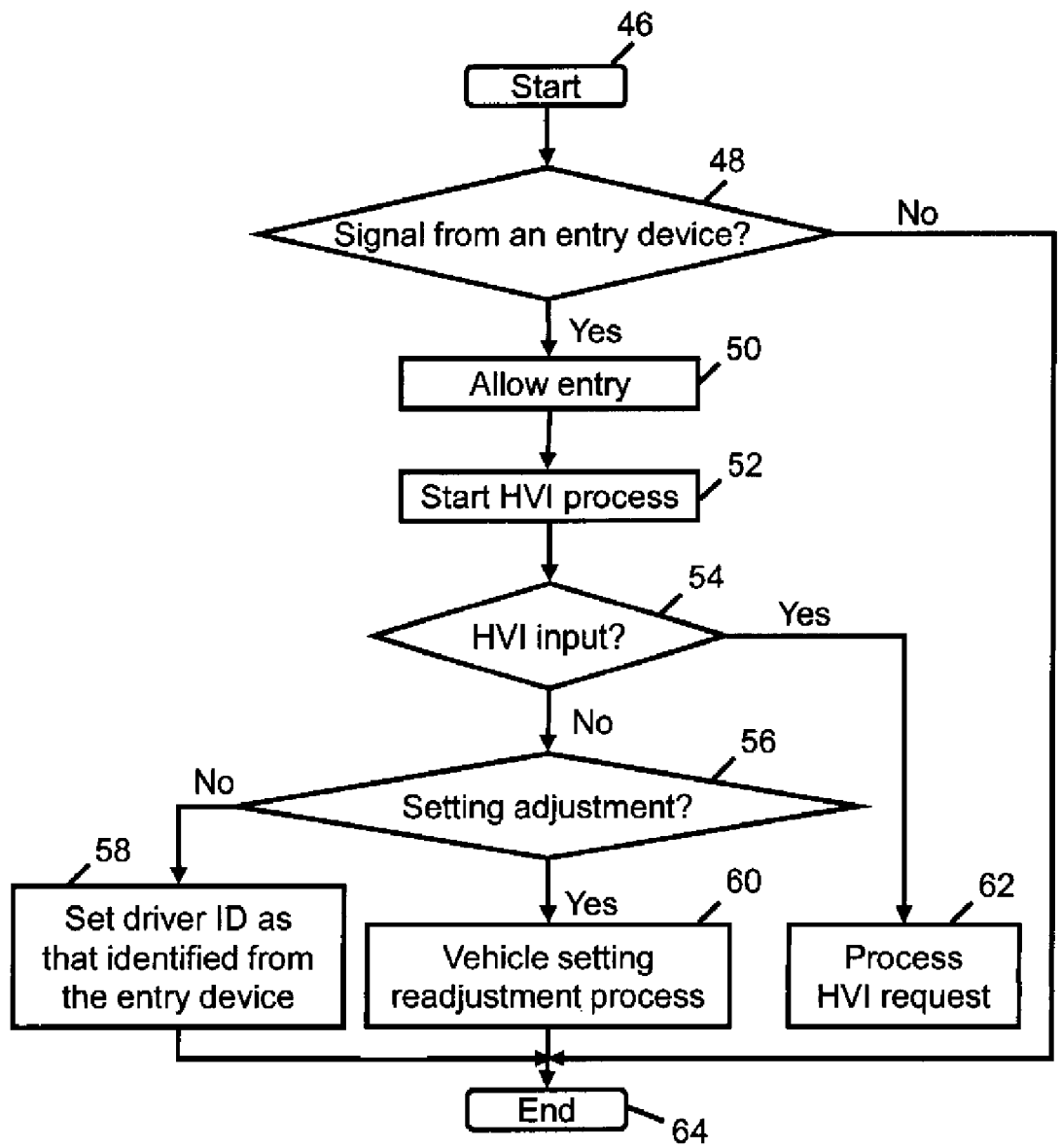
FIG. 3 is a flow diagram describing functioning of a driver ID controller, in accordance with an embodiment of the present invention.

FIG. 3 is a flow diagram 66 describing the operation of the driver ID controller 10. The method is initiated at step 46. At step 48, the transceiver 12 detects whether an entry signal has been received from an entry device, such as a key fob, and RFID immobilizer, as well as other starting devices. If the transceiver 12 does not detect the entry signal from the entry device, the process ends at step 64. If the transceiver 12 detects the entry signal from the entry device, the driver is allowed access to the vehicle at step 50. For the purpose of entry, the driver ID controller 10 commands the BCM 16, which in turn commands the appropriate LCM 18 to unlock the set of door locks 20 of the vehicle.

In one embodiment, at the step 48, the transceiver 12 checks the entry signal for the presence of a driver identifier that contains information corresponding to an authorized driver. If the driver identifier is detected in the entry signal, the driver identifier is extracted from the entry signal and the extracted driver identifier is communicated to the driver ID controller 10. In addition to commanding the LCM 18 to unlock the set of door locks 20, the driver ID controller 10 also analyzes the driver identifier to correlate a corresponding driver ID associated with an authorized driver of the vehicle. Further, the corresponding driver ID is transmitted to the LCMs 18. On receiving the corresponding driver ID, the LCM 18 retrieves a set of attributes stored for the corresponding driver ID. Further, each LCM 18 adjusts the component of the vehicle according to the set of attributes retrieved. Thus, the method and the system of the present invention are driver-specific as the parameters of the vehicle are adjusted to suit an authorized driver.

In an exemplary embodiment, a two-step adjustment process of the components of the vehicle is performed upon receiving the corresponding driver ID. In a first step of the two-step adjustment process, the LCM 18 adjusts the corresponding components to a position so as to allow maximum space for a driver corresponding to the driver ID entering the vehicle. In a second step, the LCM 18 adjusts the corresponding component of the vehicle according to the set of attributes retrieved, once the driver is seated in the driving seat 24.

In another embodiment, if the driver identifier is not detected in the entry signal, the transceiver 12 notifies the driver ID controller 10. In addition to commanding the LCM 18 to unlock the set of door locks 20, the driver ID controller 10 also retrieves a driver ID corresponding to a last-known authorized driver or one default authorized driver of the vehicle or a "guest" driver with default settings. In yet another embodiment, if the driver identifier does not correlate with a corresponding driver ID associated with an authorized driver of the vehicle, the driver ID controller 10 adjusts the parameters of the vehicle to one or more attributes corresponding to the last-known authorized driver or one default authorized driver of the vehicle or the default settings for the guest driver.

At step 52, an HVI process is started as soon as the driver is seated in the driving seat 24. The HVI process can be started via a variety of inputs to detect the presence of a driver in the driving seat of the vehicle. Examples of an input to start the HVI process include, but are not limited to, opening and closing of a vehicle door corresponding to the driving seat 24. A sensor in the driving seat 24 identifies that the driver is seated in the driving seat 24 and actuation of one or more components of the vehicle. Examples of the sensor can be, but are not limited to, a weight-sensing switch and a light interference mechanism.

At step 54, the driver ID controller 10 checks for an HVI input from the driver to start the HVI process. If the HVI input is detected, the HVI process is performed at step 62, as will be discussed below with reference to FIG. 4. If the HVI input is not detected at the step 54, then the driver ID controller 10 checks for a change in a set of attributes corresponding to parameters of components of the vehicle that are adjustable by a driver at step 56. If the change is detected at the step 56, then the driver ID controller 10 performs a method of adjusting the vehicle at step 60, discussed below with reference to FIG. 6. If the change is not detected at the step 56, the driver ID controller 10 retains the adjustment of the corresponding components of the vehicle according to the set of attributes corresponding to the driver ID identified using the driver identifier at step 58. Thereafter, the method terminates at the step 64.

Figure 4:
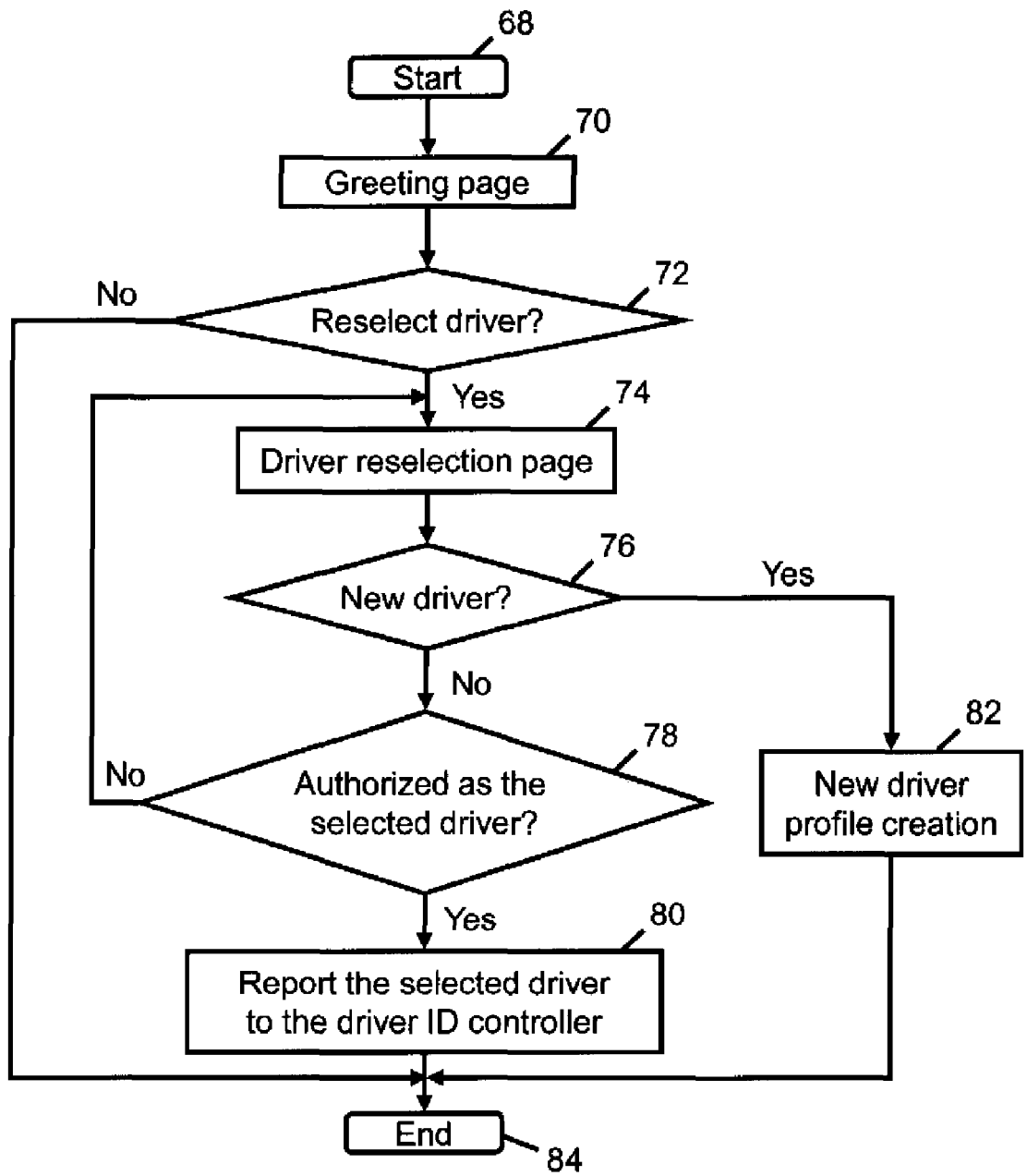
FIG. 4 is a flow diagram describing a method for processing a human vehicle interface (HVI) input, in accordance with an embodiment of the present invention.

FIG. 4 is a flow diagram 86 describing the method for processing an HVI input at the step 62. The method for processing the HVI input is initiated at step 68 as soon as the HVI input is detected. At step 70, the HVI 14 starts with a greeting page on a screen greeting the driver with the driver ID identified using the driver identifier. In one embodiment, the HVI 14 can greet the driver with the driver ID of the last-known drive if no driver identifier is detected at the step 48. Further, a driver can select from a set of preset greeting messages. In another embodiment, the driver can record and store a greeting message corresponding to the driver ID. Thereafter, the greeting message recorded can be used by the HVI 14 to greet the driver. At step 72, the greeting page can provide the driver with an option to select a driver different than the one identified. In one embodiment, a response to the option can be provided via a touch-screen button on the screen saying "Reselect Driver?". In another embodiment, the response can be provided via a key-pad on a dashboard of the vehicle. In yet another embodiment, the response can be provided via an interactive voice response system. After being provided with the option, if the driver has responded "No", the process terminates at step 84.

If the driver chooses to reselect a driver, for example, by pushing the touch-screen button saying "Reselect Driver?," at the step 72, a driver reselection page appears on the screen at step 74. At step 76, the driver reselection page can provide the driver with an option to select a new driver from a list of drivers authorized to drive the vehicle. Further, the driver reselection page can also provide an option to create a new driver profile. If the driver selects the option to create the new driver profile, step 82 is performed which is explained in detail in connection with FIG. 5. If the driver selects a driver from the list of drivers at the step 76, the HVI 14 provides the driver with an option to validate the selection of the driver using an identification code input. In one embodiment, the identification code input can be in the form of a personal identification number (PIN). In another embodiment, the identification code input can be in the form of the voice of the driver. In yet another embodiment, the identification code input can be in the form of biometric characteristic recognition, such as fingerprint, finger vein, iris, retina, handprint, voice, face, etc.

Next, the HVI 14 receives and subsequently provides the identification code input to the driver ID controller 10 at step 78. If the identification code input is found to be incorrect by the driver ID controller 10, the step 74 is performed and the driver reselection page again appears on the screen. In one embodiment, if the driver has provided an incorrect identification code input for a predetermined number of times the method may terminate. In another embodiment, the HVI 14 can report to the driver ID controller 10 about obtaining incorrect identification input for the predetermined number of times. The driver ID controller 10 upon receiving the report can lock the vehicle. Further, the driver ID controller 10 can turn off an ignition control so that the vehicle cannot be driven.

If the identification code input is found to be correct at the step 78, the HVI 14 reports the driver selected from the list of drivers to the driver ID controller 10 at step 80. The driver ID controller 10 identifies a driver ID corresponding to the selected driver. Further, the corresponding driver ID is transmitted to the LCM 18. On receiving the corresponding driver ID, the LCM 18 retrieves a set of attributes stored for the corresponding driver ID. Further, the LCM 18 adjusts the corresponding components of the vehicle according to the set of attributes retrieved. Thereafter, the method terminates at the step 84.

Figure 5:
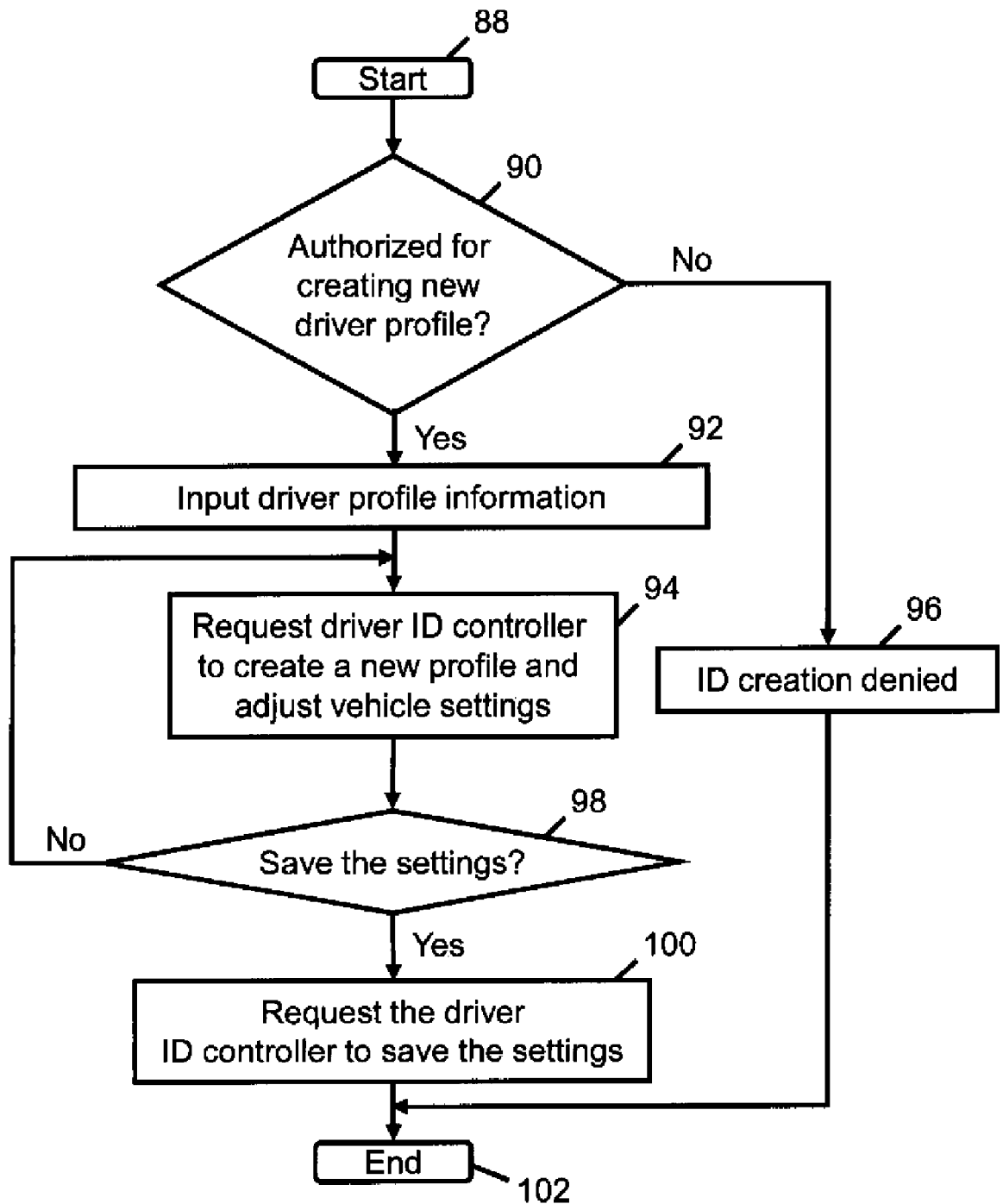
FIG. 5 is a flow diagram describing a method for creating a new driver profile, in accordance with an embodiment of the present invention.

FIG. 5 is a flow diagram 104 describing a method for creating a new driver profile at the step 82. The method is initiated at step 88 as soon as the driver selects the option to create the new driver profile. At step 90, an authorization page appears on the screen with an identification code input field requiring an identification code input from the driver. The identification code input is required to ensure the driver is authorized to create the new driver profile. In one embodiment, the HVI 14 can allow the driver to access the authorization page a predetermined number of times to provide a correct identification code input. If the driver provides a wrong identification code input for the predetermined number of times, the HVI 14 detects the driver as unauthorized to create the new driver profile, and step 96 is performed.

At the step 96, creating the new driver profile is denied by the HVI 14. Thereafter, the method terminates at step 102. In one embodiment, after the method for creating the new driver profile terminates at the step 102, the driver ID controller 10 can lock the vehicle. Further, the driver ID controller 10 can turn off an ignition control so that the vehicle can not be driven. If the identification code input is found to be correct the driver is identified as a new driver authorized to drive the vehicle and step 92 is performed.

At the step 92, the HVI 14 provides the new driver with an information input page on the screen. The information input page can be used by the new driver to input information in a set of predefined fields, such as a name of the new driver, a nickname of the new driver and a greeting message. In one embodiment, the new driver can select from a list of prerecorded greeting messages in an audio format. In another embodiment, the new driver can record a greeting message and the recorded greeting message can be used by the HVI 14 to greet the new driver, later. Further, in an embodiment, input in one or more predefined fields of the set of predefined fields can be mandatory, such as the name of the new driver. An input for the rest of the set of predefined fields, such as the nickname and the new driver and the greeting message, can be optional.

At step 94, the HVI 14 provides the set of predefined fields to the driver ID controller 10. Further, the HVI 14 requests that the driver ID controller 10 create a new driver profile and a new driver ID associating the set of predefined fields with the new driver profile and the new driver ID. Thereafter, the HVI 14 provides the new driver with an information page on the screen. The information page displays a message on the screen requesting the driver to change a set of attributes of one or more parameters corresponding to one or more components of the vehicle to suit the driving style of the new driver. Further, the information page can have a touch-screen button on the screen, saying "OK". After the new driver has made changes to the set of attributes and presses the touch-screen button, and step 98 is performed.

At the step 98, the information page displays a message, saying "Save the Settings?". The new driver can provide a response by selecting any one of a pair of touch-screen buttons displayed on the screen, saying "Yes" and "No". If the new driver has responded "No", the step 94 is performed. The HVI 14 again provides the new driver with the information page to input information in a set of predefined fields. Further, the HVI 14 again requests the new driver to change the set of attributes. If the new driver has responded "Yes", step 100 is performed. Further, in one embodiment, if the new driver fails to provide a response within a predetermined period of time, the HVI 14 selects "Yes" as the response and the step 100 is performed.

At the step 100, the HVI 14 reports to the driver ID controller 10 that the driver has responded "Yes". Further, the HVI 14 requests the driver ID controller 10 to save the set of attributes in the profile of the new driver profile. The driver ID controller 10 records the set of attributes of the parameters corresponding to the components of the vehicle from each associated LCM 18. Next, the driver ID controller 10 saves the set of attributes in the profile of the new driver profile. Further, the driver ID controller 10 retains the set of attributes corresponding to one or more parameters corresponding to one or more components of the vehicle. Thereafter, the method terminates at the step 102.

Figure 6:
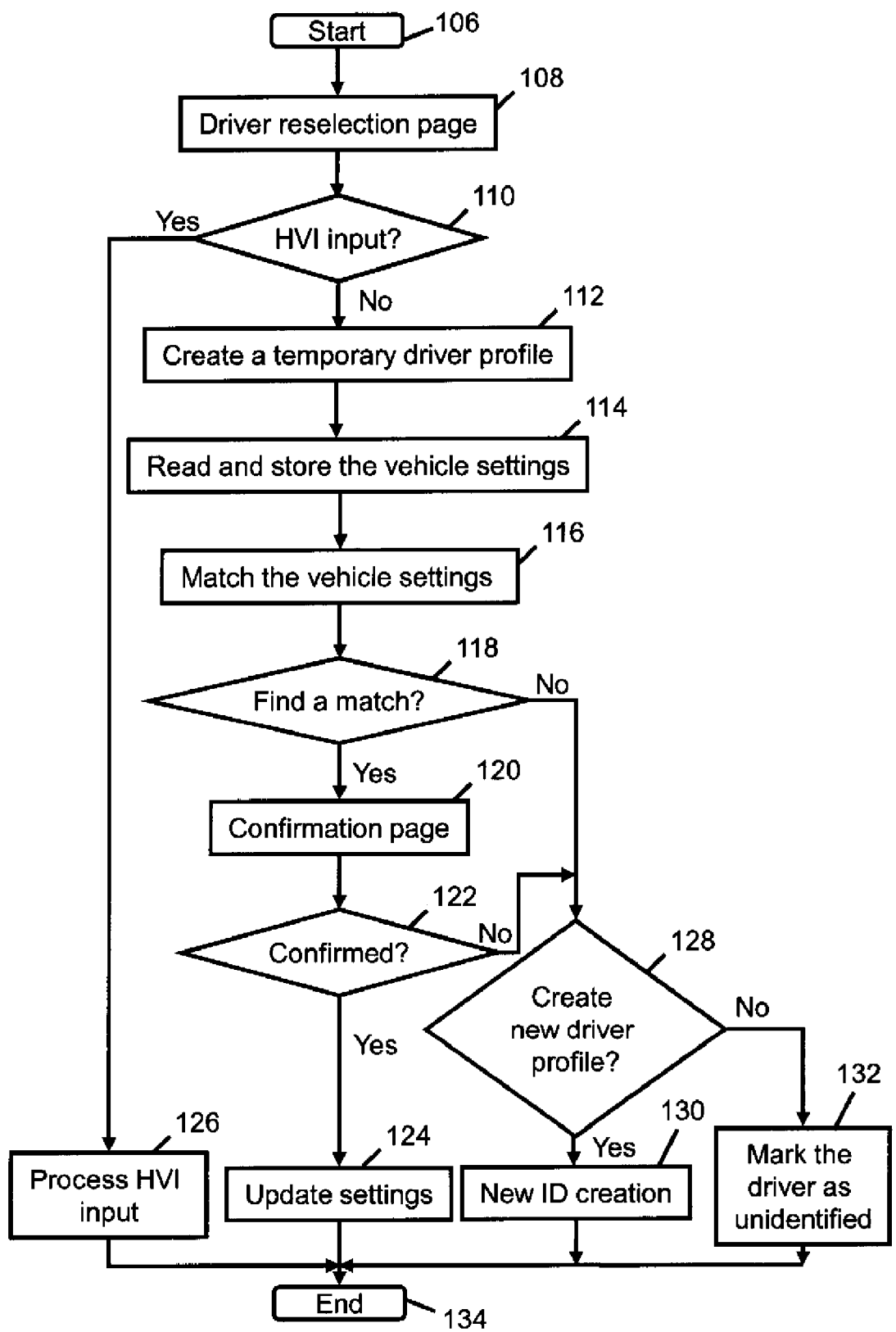
FIG. 6 is a flow diagram describing a method for adjusting vehicle settings, in accordance with an embodiment of the present invention.

FIG. 6 is a flow diagram 136 describing a method for adjusting vehicle settings at the step 60, in accordance with an embodiment of the present invention. The method is initiated at step 106 as soon as the driver ID controller 10 detects the changed set of attributes corresponding to the parameters of the components of the vehicle, as explained at the step 56 of FIG. 3. At step 108, the driver reselection page appears on the screen. At step 110, the driver ID controller 10 checks for an HVI input. If an HVI input is detected by the driver ID controller 10, step 126 is performed. At the step 126, the HVI input is processed by following the step 74 to the step 86 as shown in FIG. 4. If the HVI input is not detected step 112 is performed. At the step 112, the driver ID controller 10 creates a temporary driver profile to temporarily store the changed set of attributes. At step 114, the driver ID controller 10 records the changed set of attributes from each associated LCM 18 via the BCM 16. Next, the driver ID controller 10 stores the changed set of attributes in the temporary driver profile. At step 116, the driver ID controller 10 compares one or more set of attributes that have been stored, corresponding to one or more authorized drivers, with the changed set of attributes stored in the temporary driver profile. At step 118, if the driver ID controller 10 finds a match between the changed set of attributes stored in the temporary driver profile and a set of attributes stored corresponding to an authorized driver, step 120 is performed.

Further, a driver ID and a driver profile associated with the driver ID is retrieved by the driver ID controller 10, corresponding to the stored set of attributes. In one embodiment, the driver can be recognized as an authorized driver if at least one attribute of the changed set of attributes correlates with corresponding at least one attribute of the set of attributes stored corresponding to the authorized driver. Further, in an exemplary embodiment, 70% of the changed set of attributes correlates with those of a first authorized driver and the remaining 30% correlate with those of a second authorized driver. In this exemplary embodiment, the driver can be identified as the first authorized driver based on the percentage or number of the correlating attributes. If the driver ID controller 10 does not find a match, step 128 is performed. In another embodiment, the driver can be recognized as a new authorized driver if the at least one attribute of the changed set of attributes does not correlate with corresponding the at least one attribute of the set of attributes stored corresponding to the authorized driver. Further, in one embodiment, the driver can choose to agree or disagree with the matching driver profile found by the driver ID controller 10. If the driver chooses to disagree with the driver ID controller 10, the driver ID controller 10 records that a matching driver profile has not been found and the step 128 is performed.

At the step 120, the HVI 14 provides a confirmation page with a confirmation code input field requiring a confirmation code input from the driver. The confirmation code input is required to confirm that the driver is the driver identified corresponding to the driver profile based on the stored set of attributes. At step 122, if the driver fails to provide a correct confirmation code input, the step 128 is performed. In one embodiment, if the driver fails to provide the correct confirmation code input, the HVI 14 again provides with the confirmation page. If the driver fails to provide the correct confirmation code input for a predetermined number of times, the HVI 14 communicates this information to the driver ID controller 10. The driver ID controller 10 records that a matching driver profile has not been found and the step 128 is performed. If the driver provides the correct confirmation code input, step 124 is performed.

At the step 124, the driver profile identified by the driver ID controller 10 is updated with the changed set of attributes, i.e. the stored set of attributes is replaced by the changed set of attributes. Thereafter the method terminates at step 134.

At the step 128, the HVI 14 provides the driver with an option of creating a new driver profile. If the driver responds "Yes" to the option, step 130 is performed to create a new ID by going through the steps shown in FIG. 5. If the driver responds "No" to the option the HVI 14 reports to the driver ID controller 10, and step 132 is performed.

At the step 132, the driver ID controller 10 marks the driver as unidentified. Further, in an embodiment, the driver ID controller 10 can turn off the ignition control so that the vehicle can not be driven. Thereafter, the method terminates at step 134.

Figure 7:
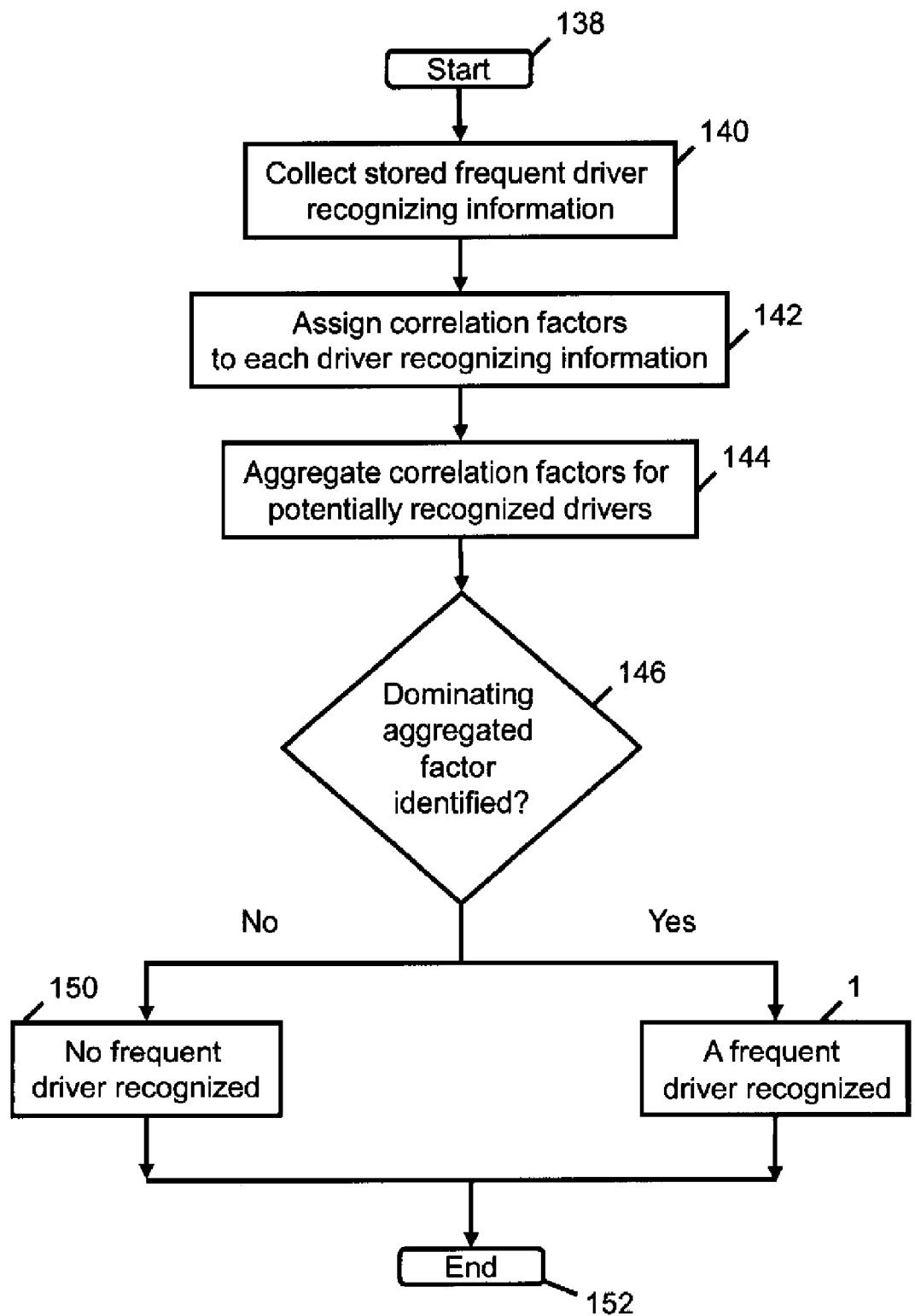
FIG. 7 is a flow diagram describing a method for recognizing a frequent driver, in accordance with an embodiment of the present invention.

FIG. 7 is a flow diagram 154 describing a method for recognizing a frequent driver, in accordance with an embodiment of the present invention. A frequent driver can be an authorized driver out of one or more authorized drivers of the vehicle who has driven the vehicle at least for a predetermined number of times during a predetermined time period. The method is initiated at step 138. At step 140, the driver ID controller 10 collects a plurality of information sets associated with the driver to be identified. Each set of information can contain a set of attributes corresponding to one or more parameters of one or more components of the vehicle. At step 142, the driver ID controller 10 assigns a correlation factor to each of the set of attributes. At step 144, the driver ID controller 10 aggregates the correlation factors corresponding to each of the set of attributes associated with the plurality of frequent drivers.

At step 146, the driver ID controller 10 checks for the presence of a dominating aggregate factor associated with the driver to be identified against those among the plurality of frequent drivers. Each and every information set, of which a corresponding part can be identified amongst the plurality of frequent drivers, will be employed and contribute to an aggregate factor pointing to the corresponding potential driver identity. If all of the information is consistent with a single driver, then there will be only one aggregate factor pointing to one driver ID. If the driver made minor changes to the settings so some information is directed away from that for this driver, there will be a small aggregate formed pointing to someone other than this driver. However, a dominating aggregate can nevertheless form during this process. If the driver ID controller 10 identifies such a dominating aggregate factor, step 148 is performed. At the step 148, an associated driver ID is retrieved by the driver ID controller 10 and a corresponding frequent driver profile is recognized. Thereafter, the method terminates at step 152. If the driver ID controller 10 fails to identify a dominating aggregate factor, step 150 is performed. At the step 150, the driver ID controller 10 declares that no frequent driver has been recognized. Thereafter, the method terminates at the step 152. In one embodiment, the driver ID controller 10 can turn off the ignition control so that the vehicle can not be driven.

Figure 8:
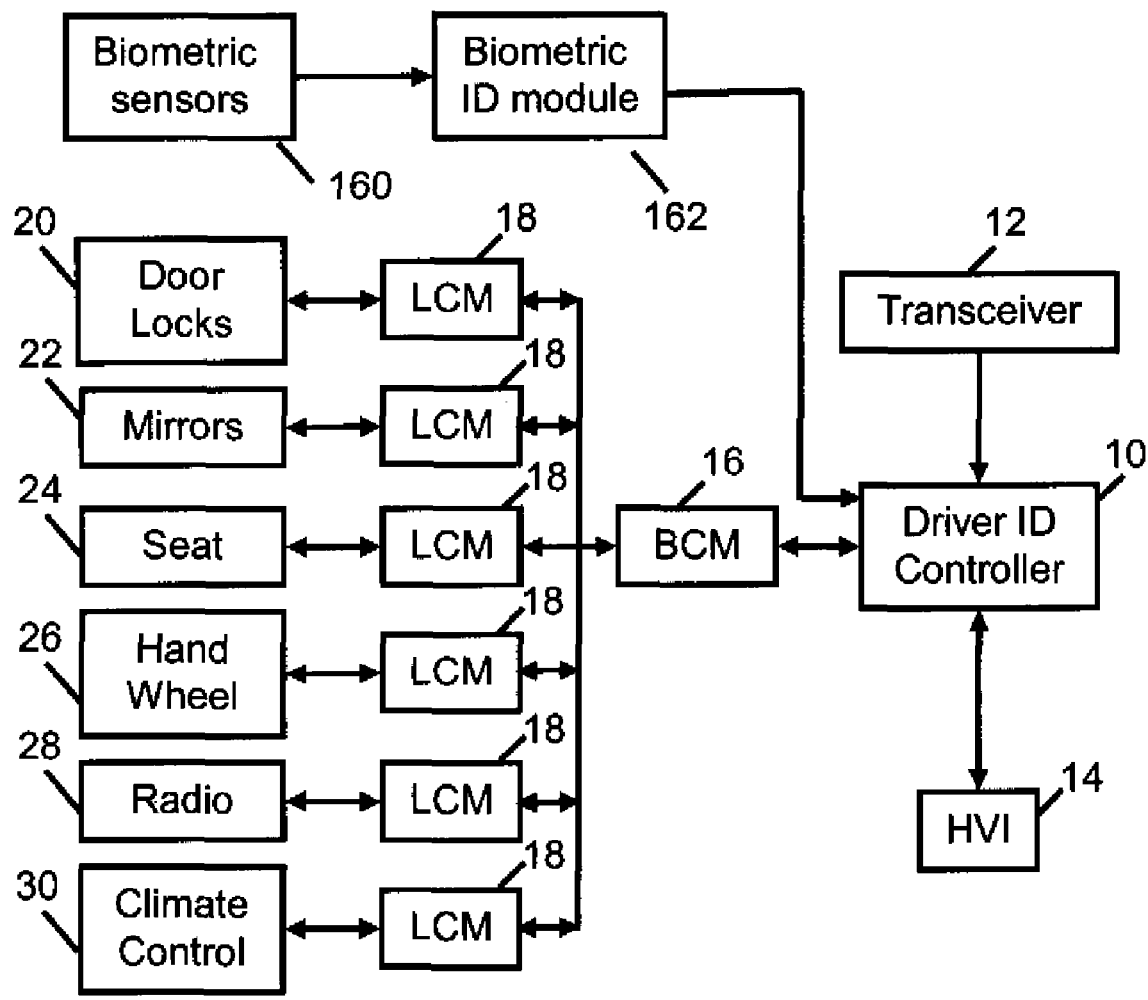
FIG. 8 is a block diagram of a driver identification system, in accordance with another embodiment of the present invention.

FIG. 8 is a block diagram of a driver identification system 164, in accordance with another embodiment of the present invention, where like components to the driver identification system 32 are identified with the same reference number. The driver identification system 164 includes one or more biometric sensors 160 and a biometric ID module 162. The biometric sensors 160 can receive biometric recognition characteristics, such as fingerprint, finger vein, iris, retina, handprint, voice and face, as an input. The received input is transmitted to the biometric ID module 162. The biometric ID module 162 analyses the input to identify a corresponding driver ID. Next, the biometric ID module 162 provides the analysis to the driver ID controller 10.

Figure 9:
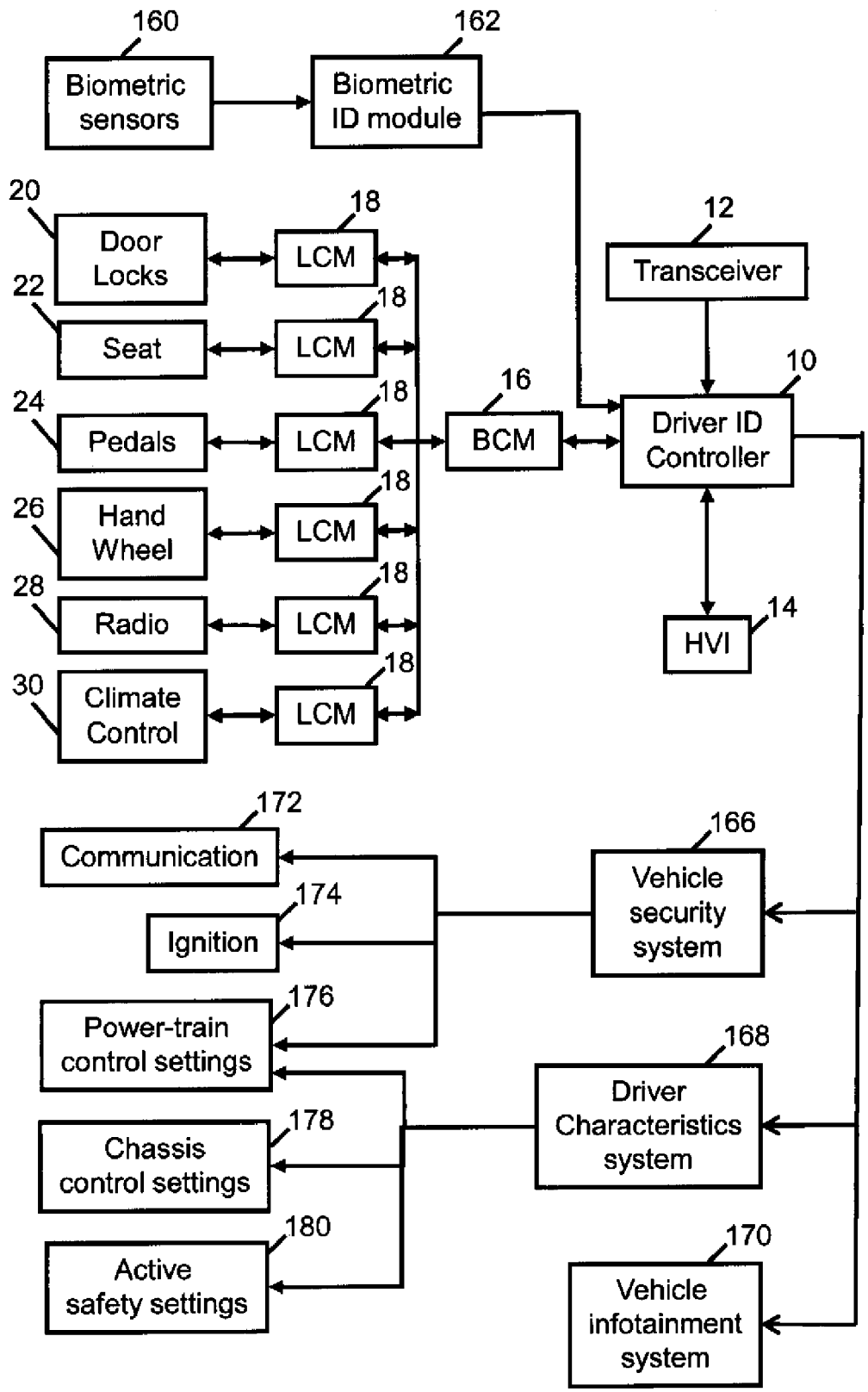
FIG. 9 is a block diagram of a driver identification system, in accordance with yet another embodiment of the present invention.

FIG. 9 is a block diagram of a driver identification system 182, in accordance with another embodiment of the present invention, where like components to the driver identification system 164 are identified with the same reference number. The driver identification system 182 includes a vehicle security system 166, a driver characteristics system 168 and a vehicle infotainment system 170 which represent the three interaction levels respectively, namely access level, accommodation level and dynamic control level. FIG. 9 shows an integration of the three levels using the driver identification system 182. Based on the driver identified by the driver identification system 182 settings corresponding to each of the three levels can be automatically adjusted. For example, if the driver identification system 182 identifies a driver as an authorized driver of the vehicle the vehicle security system 166 will permit the driver to turn on ignition 174 of the vehicle and drive. Further, the vehicle security system 166 will permit to use communication devices 172 present in the vehicle, such as a walkie-talkie. Further, the vehicle security system 166 will also permit the driver to access and modify a set of control settings corresponding to a power train 176 of the vehicle. Based on the same identification the driver characteristics system will also activate and permit the driver to access, use and modify various control settings, such as control settings for a power-train 176, a chassis 178 and an active safety system 180. Examples of an active safety system 180 include, but are not limited to, anti-lock braking system, electronic stability control, traction control and vehicle seat belt pre-tensioning. In a similar manner, the vehicle infotainment system 170 can automatically adjust to a set of preferences for the identified driver.

Various embodiments of the present invention offer one or more advantages. The present invention provides a system and method for integrating the three interaction levels, namely access, accommodation and dynamic control, to achieve the design of seamless interaction between the vehicle and the driver of the vehicle. Further, the integrated system and method eliminate the need of separate manual input for each interaction level. Additionally, the integrated system and method enhance vehicle security by automatic driver identification. Further, the integrated system and method allow for automatic adjustment of vehicle cabin components and vehicle control components.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A tire monitor sensor unit, comprising:

A method for identifying a person as an authorized driver out of one or more authorized drivers of a vehicle, said method comprising:

obtaining one or more attributes corresponding to one or more parameters of the vehicle, said one or more parameters being adjustable by the person, wherein the one or more attributes are obtained after the presence of the person is detected, and wherein the one or more attributes include one or more attributes of one or more of vehicle systems for gaining access to the vehicle, vehicle accommodation systems and dynamic control systems of the vehicle, and the systems are selected from the group comprising key fobs, RFID immobilizers, door locks, seats, windows, throttle, brake, mirrors, hand wheel, radio, climate control, infotainment, powertrain, chassis, security, ignition and safety;

comparing each of the one or more attributes with a corresponding attribute for each of the one or more authorized drivers; and recognizing the person as one authorized driver based on the comparison.

2. The method according to claim 1 wherein recognizing the person includes ascertaining the person as the authorized driver when at least one attribute of the one or more attributes correlates with a corresponding at least one attribute of the authorized driver.

3. The method according to claim 2 further comprising authorizing the person as a new authorized driver when the at least one attribute of the one or more attributes does not correlate with corresponding at least one attribute of the authorized driver.

4. The method according to claim 1 wherein recognizing the person includes obtaining for each of the one or more authorized drivers a number of attributes correlating with corresponding attributes of the one or more attributes and ascertaining the person as the authorized driver based on the number of attributes.

5. The method according to claim 1 wherein recognizing the person includes determining whether a dominating aggregate factor exists for the recognized driver based on information collected for that driver, and using the aggregate factor to retrieve the driver's ID.

6. The method according to claim 1 further comprising adjusting the one or more parameters to predefine one or more attributes corresponding to the authorized driver.

7. The method according to claim 1 further comprising receiving an identification code input by the person to validate the person as the authorized driver, and adjusting the one or more parameters to one or more attributes corresponding to the authorized driver.

8. A method for driver-specific management of one or more parameters of vehicle, said method comprising:

detecting a presence of a driver in a driving seat of the vehicle;

obtaining one or more attributes corresponding to the one or more parameters of the vehicle, said one or more parameters being adjustable by the person, wherein the one or more attributes are obtained after the presence of the driver is detected;

recognizing the driver as one authorized driver based on the one or more attributes and corresponding attributes for each of one or more authorized drivers; and adjusting the one or more parameters to predefined one or more attributes corresponding to the identified authorized driver.

9. The method according to claim 8 wherein obtaining one or more attributes includes receiving an entry signal corresponding to an intended entry by the driver and extracting a driver identifier from the entry signal.

10. The method according to claim 9 wherein recognizing the driver includes ascertaining the driver as one authorized driver when the driver identifier correlates with a driver identifier corresponding to the authorized driver.

11. The method according to claim 9 further comprising adjusting the one or more parameters to one or more attributes corresponding to a last-known authorized driver of the one or more authorized drivers when the driver identifier does not correlate with a driver identifier corresponding to the authorized driver.

12. The method according to claim 9 further comprising authorizing the driver as a new authorized driver when the driver identifier does not correlate with a driver identifier corresponding to any existing authorized drivers.

13. The method according to claim 8 wherein the attributes relate to vehicle systems for gaining access to the vehicle, vehicle accommodation systems and dynamic control systems of the vehicle.

14. The method according to claim 13 wherein the systems are selected from the group comprising key fobs, RFID immobilizers, door locks, sears, windows, throttle, brake, mirrors, hand wheel, radio, climate control, infotainment, power-train, chassis, security, ignition and safety.

15. A system for driver-specific management of one or more parameters of a vehicle, said system comprising:

a sensor capable of detecting a presence of a driver in the vehicle; one or more control modules corresponding to the one or more parameters, said control modules being capable of controlling the one or more parameters, said control modules also being capable of monitoring the one or more parameters to obtain one or more attributes, where the one or more attributes include one or more attributes of one or more of vehicle systems for gaining access to the vehicle, vehicle accommodation systems and dynamic control systems of the vehicle, and the systems are selected from the group comprising key fobs, RFID immobilizers, door locks, seats, windows, throttle, brake, mirrors, hand wheel, radio, climate control, infotainment, powertrain, chassis, security, ignition and safety; and a driver ID controller coupled to the one or more control modules and the sensor, the driver ID controller being configured to recognize the driver as an authorized driver based on inputs from the sensor and the one or more control modules and command the one or more control modules to adjust the one or more parameters to the one or more attributes predefined to correspond to the authorized driver.

16. The system according to claim 15 further comprising an interface to facilitate input by the driver and display of information.

17. The system according to claim 16 wherein the interface comprises a processing unit to process input by the driver.

18. The system according to claim 15 wherein the vehicle includes access level sub-systems, accommodation level sub-systems and dynamic control level sub-systems, and wherein the driver ID controller integrates the access level sub-systems, the accommodation level sub-systems and the dynamic control level sub-systems by adjusting settings for the access level sub-systems, the accommodation level sub-systems and the dynamic control level sub-systems for the recognized driver.

* * * * *